(12) United States Patent
Long et al.

(10) Patent No.: US 12,344,996 B2
(45) Date of Patent: Jul. 1, 2025

(54) BIO-BASED WATERPROOF AND OIL-PROOF WRAPPING PAPER AND PREPARATION METHOD THEREOF

(71) Applicant: Jiangnan University, Wuxi (CN)

(72) Inventors: Zhu Long, Wuxi (CN); Ruifeng Zhu, Wuxi (CN)

(73) Assignee: Jiangnan University, Wuxi (CN)

( * ) Notice: Subject to any disclaimer, the term of this patent is extended or adjusted under 35 U.S.C. 154(b) by 95 days.

(21) Appl. No.: 18/210,709

(22) Filed: Jun. 16, 2023

(65) Prior Publication Data

US 2023/0323602 A1    Oct. 12, 2023

(30) Foreign Application Priority Data

Jun. 21, 2022  (CN) .......................... 202210722909.2

(51) Int. Cl.
| | | |
|---|---|---|
| *D21H 19/12* | (2006.01) | |
| *D21H 17/66* | (2006.01) | |
| *D21H 19/40* | (2006.01) | |
| *D21H 19/44* | (2006.01) | |
| *D21H 19/82* | (2006.01) | |
| *D21H 21/16* | (2006.01) | |
| *D21H 27/10* | (2006.01) | |

(52) U.S. Cl.
CPC .............. *D21H 21/16* (2013.01); *D21H 17/66* (2013.01); *D21H 19/12* (2013.01); *D21H 19/40* (2013.01); *D21H 19/44* (2013.01); *D21H 19/82* (2013.01)

(58) Field of Classification Search
CPC ........ D21H 21/16; D21H 17/66; D21H 19/12; D21H 19/40; D21H 9/44; D21H 19/82
See application file for complete search history.

(56) References Cited

U.S. PATENT DOCUMENTS

| | | | | |
|---|---|---|---|---|
| 2011/0262745 A1* | 10/2011 | Ronka | ..................... | D21H 23/22 |
| | | | | 427/209 |
| 2014/0112973 A1* | 4/2014 | Steinberg | .................. | A61P 3/10 |
| | | | | 424/443 |
| 2017/0350074 A1* | 12/2017 | Kinast | ..................... | D21H 19/46 |
| 2021/0246333 A1* | 8/2021 | Rabnawaz | ........... | C09D 105/08 |
| 2023/0347378 A1* | 11/2023 | Gerli | ....................... | D21H 19/54 |

* cited by examiner

*Primary Examiner* — Dah-Wei D. Yuan
*Assistant Examiner* — Kristen A Dagenais
(74) *Attorney, Agent, or Firm* — IPRO, PLLC

(57) ABSTRACT

The present disclosure discloses a bio-based waterproof and oil-proof wrapping paper and a preparation method thereof, and belongs to the field of waterproof and oil-proof papers. The method for preparing the waterproof and oil-proof wrapping paper in the present disclosure includes: (1) impregnating base paper in a calcium chloride solution, taking out the base paper, and drying the base paper; (2) mixing sodium alginate, a plasticizer and water uniformly to obtain a sodium alginate solution; mixing an acetic acid aqueous solution, chitosan, a plasticizer and a crosslinking agent uniformly to obtain a chitosan solution; then coating a surface of the calcium chloride pretreated base paper with the sodium alginate solution, followed by drying to obtain a single-layer oil-proof paper; and then coating a surface of the single-layer oil-proof paper with the chitosan solution, followed by drying to obtain a double-layer oil-proof paper; and (3) adding nanoparticles into a biological wax solution; and then coating a surface of the double-layer oil-proof paper with the biological wax-nanoparticle solution, followed by drying to obtain the waterproof and oil-proof paper.

13 Claims, No Drawings

BIO-BASED WATERPROOF AND OIL-PROOF WRAPPING PAPER AND PREPARATION METHOD THEREOF

TECHNICAL FIELD

The present disclosure relates to a bio-based waterproof and oil-proof wrapping paper and a preparation method thereof, and belongs to the field of waterproof and oil-proof papers.

BACKGROUND

Paper is a material with a three-dimensional network structure consisting of fibers and has poor waterproof and oil-proof properties when directly used in wrapping of foods. The above problems are solved by wrapping paper with waterproof and oil-proof properties. As a kind of paper resistant to penetration of oil and water, the waterproof and oil-proof wrapping paper is usually used for wrapping foods with high contents of oil and water, such as hamburgers, pastries, traditional Chinese fast foods and the like.

Perfluoroalkyl substances and polyfluoroalkyl substances (PFAS) are important chemicals that have been used in a variety of consumer goods and industrial products for decades, including paper wrapping. PFAS additives have been used in wrapping paper and food service utensils for a long time to provide excellent waterproof and oil-proof effects. However, since fluorine-containing substances are prone to causing harm to the human body and the environment, the development space of such substances is gradually reduced and is particularly on the edge of elimination in foreign countries.

At present, the most widely used way in the market is to cover the surface of paper with a plastic film, so that the paper has waterproof and oil-proof effects. However, some petroleum-based polymers used, such as polyethylene (PE), polypropylene (PP), polyethylene terephthalate (PET) and the like, cannot be degraded in nature, leading to the problem of environmental pollution. Moreover, after such materials are used in large quantities, petroleum resources will also be consumed, leading to energy crisis.

With people's increasing awareness of physical health and environmental protection, biodegradable materials have gradually become a research hotspot instead of traditional plastic materials due to the characteristics of no toxicity and environmental friendliness. However, whether the biodegradable materials can completely replace plastic wrapping needs to be further studied. For example, polylactic acid (PLA) has biodegradability and good processability, but polylactic acid films are fragile and high in crystallinity, so that the application of the polylactic acid is limited. As a non-toxic and promising crystalline biopolymer, polyhydroxyalkanoate (PHA) has an excellent waterproof property, but also has thermal instability and difficult processability, so that the application of the PHA is hindered.

For example, the patent CN107619451A discloses a fluorinated copolymer for waterproof and oil-proof paper and a preparation method of an emulsion thereof. An excellent waterproof and oil-proof synergistic effect can be achieved after cooperative use of the fluorinated copolymer. However, a fluorine monomer is used in the method, and the substance will accumulate in the human body, leading to unsafety to the human body. The patent CN105694171A discloses a coated paper produced by hydraulic molding after spraying a polyethylene master batch on the surface of base paper. The coated paper has the advantages of good moistureproof, oil-proof and isolating effects and the like. However, the oil-proof paper prepared by the method is difficult to degrade and recycle, leading to environmental pollution. Moreover, harmful substances in the coated paper will be delivered into foods. The patent CN110777566A discloses a preparation method of a waterproof and oil-proof coating consisting of modified chitosan, montmorillonite and a fluorosilicone organic compound. By way of the method, the paper can achieve good waterproof and oil-proof effects. However, fluorosilane used may cause harm to the human body. The patent CN110792004A discloses a degradable food-grade oil-proof paper prepared from titanium dioxide, sodium alginate, carnauba wax and other raw materials. The oil-proof paper has a good antibacterial effect and a high water contact angle, but also has a low oil-proof level.

SUMMARY

Technical Problems

At present, a waterproof and oil-proof wrapping paper has some shortcomings and still needs to be improved greatly. How to prepare a waterproof and oil-proof wrapping paper with excellent properties, environmental friendliness, degradability and no harm to the human body will become a hot topic of food wrapping in the future.

Technical Solutions

In order to solve the above problems, the present disclosure provides a bio-based waterproof and oil-proof wrapping paper and a preparation method thereof. The bio-based waterproof and oil-proof wrapping paper of the present disclosure has excellent waterproof and oil-proof effects. The surface of the paper is provided with a double-layer oil-proof coating and a single-layer waterproof coating, ensuring that the paper has a better oil-proof level and water resistance. Moreover, a natural bio-based polymer is used as a raw material of the coating in the present disclosure, the waterproof and oil-proof paper prepared is environmentally friendly, free of toxicity, harmless to the human body, recyclable and degradable, and the mechanical strength of the paper can be improved.

A first objective of the present disclosure is to provide a method for preparing a bio-based waterproof and oil-proof wrapping paper. The method includes the following steps:
(1) pretreatment of base paper:
impregnating base paper in a calcium chloride solution, taking out the base paper, and drying the base paper to obtain a calcium chloride pretreated base paper;
(2) treatment with an oil-proof coating:
mixing sodium alginate, a plasticizer and water uniformly to obtain a sodium alginate solution; mixing an acetic acid aqueous solution, chitosan, a plasticizer and a crosslinking agent uniformly to obtain a chitosan solution; then coating a surface of the calcium chloride pretreated base paper with the sodium alginate solution, followed by drying to obtain a single-layer oil-proof paper; and then coating a surface of the single-layer oil-proof paper with the chitosan solution, followed by drying to obtain a double-layer oil-proof paper; and
(3) treatment with a waterproof coating:
adding nanoparticles into a biological wax solution to obtain a biological wax-nanoparticle solution; and then coating a surface of the double-layer oil-proof paper with the biological wax-nanoparticle solution, followed by drying to obtain the waterproof and oil-proof paper.

In one embodiment of the present disclosure, in step (1), a mass concentration of the calcium chloride solution is 1.0-3.0%, the impregnating is conducted at 20-30° C. (normal temperature) for 1-5 min, and the drying is conducted at 40-50° C. for 5-10 min.

In one embodiment of the present disclosure, in step (2), a mass concentration of the sodium alginate in the sodium alginate solution is 0.5-2.0%, a mass concentration of the plasticizer is 0.4-0.6%, and the plasticizer includes one or more of glycerol, xylitol and sorbitol.

In one embodiment of the present disclosure, in step (2), a mass concentration of the chitosan in the chitosan solution is 1.0-3.0%, a mass concentration of the plasticizer is 0.4-0.6%, and the plasticizer includes one or more of glycerol, xylitol and sorbitol; a mass concentration of the crosslinking agent is 0.8-1.2%, and the crosslinking agent includes one or more of itaconic acid, vanillic acid and gallic acid; and a mass concentration of the acetic acid aqueous solution is 1.0%.

In one embodiment of the present disclosure, in step (2), the sodium alginate solution is coated at a rate of 1-6 cm/s in a coating amount of 1.0-5.0 g/m$^2$; and the drying is conducted at 50-65° C. for 10-30 min.

In one embodiment of the present disclosure, in step (2), the chitosan solution is coated at a rate of 1-4 cm/s in a coating amount of 1.0-5.0 g/m$^2$; and the drying is conducted at 50-60° C. for 10-30 min.

In one embodiment of the present disclosure, in step (3), the natural biological wax includes one or more of carnauba wax, beeswax, soybean wax and candelilla wax; the nanoparticles include one or more of nano silica, nano titanium dioxide and nano zinc oxide; and anhydrous ethanol is used as a solvent of the biological wax solution.

In one embodiment of the present disclosure, in step (3), a mass concentration of the natural biological wax solution is 0.2-5.0%; and a mass concentration of the nanoparticles is 0.2-3.0%.

In one embodiment of the present disclosure, in step (3), the coating is conducted at a rate of 1-5 cm/s in a coating amount of 1.0-6.0 g/m$^2$; and the drying is conducted at 30-50° C. for 10-35 min.

In one embodiment of the present disclosure, in step (2) and step (3), the waterproof coating and the oil-proof coating may be coated on one surface or on two surfaces.

A second objective of the present disclosure is to provide a waterproof and oil-proof paper prepared by the method of the present disclosure.

A third objective of the present disclosure is to provide application of the waterproof and oil-proof paper of the present disclosure in the field of wrapping.

In one embodiment of the present disclosure, the application includes food wrapping.

Beneficial Effects (1) According to the present disclosure, a layer-by-layer assembly technology (LBL) is adopted. The base paper is pretreated with the calcium chloride solution, and the sodium alginate solution is coated on the base paper. Through the interaction of Ca$^{2+}$ and —COO—, mechanical properties of the paper are enhanced. Then, the single-layer oil-proof paper is coated with the crosslinking agent treated chitosan solution, and the plasticizer is added to achieve a better film forming effect, so that the oil-proof paper prepared has a more excellent oil-proof property.

(2) According to the present disclosure, acidic substances, such as the itaconic acid, the vanillic acid and the gallic acid, are used as the crosslinking agent to treat the prepared chitosan solution so as to form a film with the chitosan solution. Through a reaction of —COO— on the surfaces of the three acids and NH$^{3+}$ on the surface of the chitosan, an electrostatic effect is reduced. Then, the film is subjected to layer-by-layer assembly with the coated sodium alginate coating, so that mechanical properties of the oil-proof paper are greatly improved.

(3) According to the present disclosure, the natural biological wax is combined with the nanoparticles to form a "lotus leaf" type hydrophobic surface, so that the oil-proof paper has a good hydrophobic effect.

(4) According to the present disclosure, the natural bio-based polysaccharide and the natural biological wax, both of which belong to natural bio-based polymers, are used as main raw materials, so that the waterproof and oil-proof paper prepared can be completely biodegradable and harmless to the environment and the human body.

(5) The waterproof and oil-proof paper of the present disclosure has an oil-proof level of 8 or greater, a Cobb value of 14.88 g/m$^2$ or less, a tensile strength of 4.3 kN/m or greater, a water vapor transmission rate of 650 g/m$^2$·24 h or less, an air permeability of 0.46 mL/min or less and a thickness of 0.2-0.28 mm.

DETAILED DESCRIPTION

Exemplary examples of the present disclosure are described below. It should be understood that the examples are intended to better explain the present disclosure, rather than to limit the present disclosure.

Testing methods are as follows.

The oil-proof property is tested based on TAPPI T 559 cm-02 "Grease resistance test for paper and paperboard".

The waterproof property is tested based on GB/T 1540-2002 "Paper and board-Determination of water absorption-Cobb method".

The tensile strength is tested based on GB/T 12914-2018 "Paper and board-Determination of tensile properties-Constant rate of elongation method".

The air permeability is tested based on GB/T 458-2008 "Paper and board-Determination of air permeance".

The water vapor transmission rate is tested based on GB/T 22921-2008 "Paper and board-Determination of water vapor transmission rate of sheet materials-Dynamic sweep and static gas methods".

Raw materials used in the examples are as follows.

The particle size of nano silica is 7-40 nm; the particle size of nano titanium dioxide is 60 nm; and the particle size of nano zinc oxide is 80 nm.

Specification parameters of chitosan include that the deacetylation degree is equal to or greater than 95%, and the viscosity is 100-200 mpas.

White base paper for food wrapping, specifically prepared from softwood pulp, is used as base paper, which has a gram weight of 40 g/m$^2$ and is purchased from Zhejiang Xianhe Co., Ltd.; and the base paper has an oil-proof level of 4, a tensile index of 3.45 kN/m and a thickness of 0.04 mm.

Example 1

A method for preparing a bio-based waterproof and oil-proof wrapping paper includes the following steps:
(1) pretreatment of base paper:
dissolving calcium chloride in water to obtain a calcium chloride solution with a mass concentration of 2.0%; and impregnating base paper in the calcium chloride solution at normal temperature for 3 min, taking out the base paper, and drying the base paper at 45° C. for 6 min to obtain a calcium chloride pretreated base paper;

(2) treatment with an oil-proof coating:

adding sodium alginate into water, conducting heating and stirring for 20 min to make the sodium alginate completely dissolved, adding glycerol with a mass concentration of 0.5%, and conducting magnetic stirring for 10 min, followed by ultrasonic treatment for 20 min to obtain a sodium alginate solution with a mass concentration of 1.5%;

adding acetic acid into water to obtain an acetic acid solution with a mass fraction of 1.0%; adding chitosan into the acetic acid solution, adding vanillic acid with a mass concentration of 1.0% and glycerol with a mass concentration of 0.5%, and conducting heating and stirring for 20 min, followed by ultrasonic treatment for 20 min to obtain a chitosan solution with a mass concentration of 2.0%;

and then coating the front surface of the calcium chloride pretreated base paper with the sodium alginate solution on a roller coater at a rate of 3 cm/s in a coating amount of 3.0 g/m², and drying the paper in a vacuum drying oven at 55° C. for 15 min to obtain a single-layer oil-proof paper; and then coating the front surface of the single-layer oil-proof paper with the chitosan solution on the roller coater at a rate of 2 cm/s in a coating amount of 3.0 g/m², and drying the paper in the vacuum drying oven at 60° C. for 10 min to obtain a double-layer oil-proof paper; and (3) treatment with a waterproof coating:

adding carnauba wax into anhydrous ethanol, conducting heating and stirring to obtain a carnauba wax solution with a mass concentration of 1.0%; after the solution was cooled, adding nano silica particles to obtain a solution with a mass concentration of 3.0%, and conducting magnetic stirring for 20 min to obtain a carnauba wax-nano silica solution;

and then coating the front surface of the double-layer oil-proof paper with the carnauba wax-nano silica solution on the roller coater at a rate of 2 cm/s in a coating amount of 3.0 g/m², and drying the paper in the vacuum drying oven at 35° C. for 15 min to obtain the waterproof and oil-proof wrapping paper.

Example 2

A method for preparing a bio-based waterproof and oil-proof wrapping paper includes the following steps:

(1) pretreatment of base paper:

dissolving calcium chloride in water to obtain a calcium chloride solution with a mass concentration of 1.0%; and impregnating base paper in the calcium chloride solution at normal temperature for 4 min, taking out the base paper, and drying the base paper at 45° C. for 5 min to obtain a calcium chloride pretreated base paper;

(2) treatment with an oil-proof coating:

adding sodium alginate into water, conducting heating and stirring for 20 min to make the sodium alginate completely dissolved, adding glycerol with a mass concentration of 0.5%, and conducting magnetic stirring for 10 min, followed by ultrasonic treatment for 20 min to obtain a sodium alginate solution with a mass concentration of 1.0%;

adding acetic acid into water to obtain an acetic acid solution with a mass fraction of 1.0%; adding chitosan into the acetic acid solution, adding vanillic acid with a mass concentration of 1.0% and glycerol with a mass concentration of 0.5%, and conducting heating and stirring for 20 min, followed by ultrasonic treatment for 20 min to obtain a chitosan solution with a mass concentration of 1.0%;

and then coating the front surface of the calcium chloride pretreated base paper with the sodium alginate solution on a roller coater at a rate of 3 cm/s in a coating amount of 2.0 g/m², and drying the paper in a vacuum drying oven at 55° C. for 15 min to obtain a single-layer oil-proof paper; and then coating the front surface of the single-layer oil-proof paper with the chitosan solution on the roller coater at a rate of 2 cm/s in a coating amount of 3.0 g/m², and drying the paper in the vacuum drying oven at 60° C. for 10 min to obtain a double-layer oil-proof paper; and (3) treatment with a waterproof coating:

adding candelilla wax into anhydrous ethanol, conducting heating and stirring to obtain a candelilla wax solution with a mass concentration of 1.0%; after the solution was cooled, adding nano silica particles to obtain a solution with a mass concentration of 3.0%, and conducting magnetic stirring for 20 min to obtain a candelilla wax-nano silica solution;

and then coating the front surface of the double-layer oil-proof paper with the candelilla wax-nano silica solution on the roller coater at a rate of 2 cm/s in a coating amount of 3.0 g/m², and drying the paper in the vacuum drying oven at 35° C. for 15 min to obtain the waterproof and oil-proof wrapping paper.

Example 3

A method for preparing a bio-based waterproof and oil-proof wrapping paper includes the following steps:

(1) pretreatment of base paper:

dissolving calcium chloride in water to obtain a calcium chloride solution with a mass concentration of 2.0%; and impregnating base paper in the calcium chloride solution at normal temperature for 3 min, taking out the base paper, and drying the base paper at 45° C. for 6 min to obtain a calcium chloride pretreated base paper;

(2) treatment with an oil-proof coating:

adding sodium alginate into water, conducting heating and stirring for 20 min to make the sodium alginate completely dissolved, adding sorbitol with a mass concentration of 0.5%, and conducting magnetic stirring for 10 min, followed by ultrasonic treatment for 20 min to obtain a sodium alginate solution with a mass concentration of 1.5%;

adding acetic acid into water to obtain an acetic acid solution with a mass fraction of 1.0%; adding chitosan into the acetic acid solution, adding gallic acid with a mass concentration of 1.0% and sorbitol with a mass concentration of 0.5%, and conducting heating and stirring for 20 min, followed by ultrasonic treatment for 20 min to obtain a chitosan solution with a mass concentration of 1.0%;

and then coating the front surface of the calcium chloride pretreated base paper with the sodium alginate solution on a roller coater at a rate of 3 cm/s in a coating amount of 3.0 g/m², and drying the paper in a vacuum drying oven at 55° C. for 20 min to obtain a single-layer oil-proof paper; and then coating the front surface of the single-layer oil-proof paper with the chitosan solution on the roller coater at a rate of 2 cm/s in a coating amount of 4.0 g/m², and drying the paper in the vacuum drying oven at 60° C. for 10 min to obtain a double-layer oil-proof paper; and (3) treatment with a waterproof coating:

adding beeswax into anhydrous ethanol, conducting heating and stirring to obtain a beeswax solution with a mass concentration of 1.0%; after the solution was cooled, adding nano silica particles to obtain a solution with a mass concentration of 3.0%, and conducting magnetic stirring for 20 min to obtain a beeswax-nano silica solution;

and then coating the front surface of the double-layer oil-proof paper with the beeswax-nano silica solution on the roller coater at a rate of 2 cm/s in a coating amount of 3.0 g/m², and drying the paper in the vacuum drying oven at 35° C. for 10 min to obtain the waterproof and oil-proof wrapping paper.

Example 4

A method for preparing a bio-based waterproof and oil-proof wrapping paper includes the following steps:

(1) pretreatment of base paper:

dissolving calcium chloride in water to obtain a calcium chloride solution with a mass concentration of 1.5%; and impregnating base paper in the calcium chloride solution at normal temperature for 3 min, taking out the base paper, and drying the base paper at 45° C. for 6 min to obtain a calcium chloride pretreated base paper;

(2) treatment with an oil-proof coating:

adding sodium alginate into water, conducting heating and stirring for 20 min to make the sodium alginate completely dissolved, adding sorbitol with a mass concentration of 0.5%, and conducting magnetic stirring for 10 min, followed by ultrasonic treatment for 20 min to obtain a sodium alginate solution with a mass concentration of 2.0%;

adding acetic acid into water to obtain an acetic acid solution with a mass fraction of 1.0%; adding chitosan into the acetic acid solution, adding gallic acid with a mass concentration of 1.0% and sorbitol with a mass concentration of 0.5%, and conducting heating and stirring for 20 min, followed by ultrasonic treatment for 20 min to obtain a chitosan solution with a mass concentration of 1.5%;

and then coating the front surface of the calcium chloride pretreated base paper with the sodium alginate solution on a roller coater at a rate of 4 cm/s in a coating amount of 4.0 g/m², and drying the paper in a vacuum drying oven at 60° C. for 20 min to obtain a single-layer oil-proof paper; and then coating the front surface of the single-layer oil-proof paper with the chitosan solution on the roller coater at a rate of 3 cm/s in a coating amount of 3.0 g/m², and drying the paper in the vacuum drying oven at 60° C. for 15 min to obtain a double-layer oil-proof paper; and (3) treatment with a waterproof coating:

adding soybean wax into anhydrous ethanol, conducting heating and stirring to obtain a soybean wax solution with a mass concentration of 1.0%; after the solution was cooled, adding nano titanium dioxide particles to obtain a solution with a mass concentration of 2.5%, and conducting magnetic stirring for 20 min to obtain a soybean wax-nano titanium dioxide solution;

and then coating the front surface of the double-layer oil-proof paper with the soybean wax-nano titanium dioxide solution on the roller coater at a rate of 2 cm/s in a coating amount of 3.0 g/m², and drying the paper in the vacuum drying oven at 35° C. for 10 min to obtain the waterproof and oil-proof wrapping paper.

Example 5

A method for preparing a bio-based waterproof and oil-proof wrapping paper includes the following steps:

(1) pretreatment of base paper:

dissolving calcium chloride in water to obtain a calcium chloride solution with a mass concentration of 1.0%; and impregnating base paper in the calcium chloride solution at normal temperature for 3 min, taking out the base paper, and drying the base paper at 45° C. for 6 min to obtain a calcium chloride pretreated base paper;

(2) treatment with an oil-proof coating:

adding sodium alginate into water, conducting heating and stirring for 20 min to make the sodium alginate completely dissolved, adding xylitol with a mass concentration of 0.5%, and conducting magnetic stirring for 10 min, followed by ultrasonic treatment for 20 min to obtain a sodium alginate solution with a mass concentration of 2.0%;

adding acetic acid into water to obtain an acetic acid solution with a mass fraction of 1.0%; adding chitosan into the acetic acid solution, adding itaconic acid with a mass concentration of 1.0% and xylitol with a mass concentration of 0.5%, and conducting heating and stirring for 20 min, followed by ultrasonic treatment for 20 min to obtain a chitosan solution with a mass concentration of 2.0%;

and then coating the front surface of the calcium chloride pretreated base paper with the sodium alginate solution on a roller coater at a rate of 3 cm/s in a coating amount of 2.0 g/m², and drying the paper in a vacuum drying oven at 55° C. for 10 min to obtain a single-layer oil-proof paper; and then coating the front surface of the single-layer oil-proof paper with the chitosan solution on the roller coater at a rate of 2 cm/s in a coating amount of 3.0 g/m², and drying the paper in the vacuum drying oven at 60° C. for 10 min to obtain a double-layer oil-proof paper; and (3) treatment with a waterproof coating:

adding carnauba wax into anhydrous ethanol, conducting heating and stirring to obtain a carnauba wax solution with a mass concentration of 1.0%; after the solution was cooled, adding nano titanium dioxide particles to obtain a solution with a mass concentration of 3.0%, and conducting magnetic stirring for 20 min to obtain a carnauba wax-nano titanium dioxide solution;

and then coating the front surface of the double-layer oil-proof paper with the carnauba wax-nano titanium dioxide solution on the roller coater at a rate of 2 cm/s in a coating amount of 3.0 g/m², and drying the paper in the vacuum drying oven at 35° C. for 10 min to obtain the waterproof and oil-proof wrapping paper.

Example 6

A method for preparing a bio-based waterproof and oil-proof wrapping paper includes the following steps:

(1) pretreatment of base paper:

dissolving calcium chloride in water to obtain a calcium chloride solution with a mass concentration of 2.0%; and impregnating base paper in the calcium chloride solution at normal temperature for 3 min, taking out the base paper, and drying the base paper at 45° C. for 6 min to obtain a calcium chloride pretreated base paper;

(2) treatment with an oil-proof coating:

adding sodium alginate into water, conducting heating and stirring for 20 min to make the sodium alginate completely dissolved, adding xylitol with a mass concentration of 0.5%, and conducting magnetic stirring for 10 min, followed by ultrasonic treatment for 20 min to obtain a sodium alginate solution with a mass concentration of 2%;

adding acetic acid into water to obtain an acetic acid solution with a mass fraction of 1.0%; adding chitosan into the acetic acid solution, adding itaconic acid with a mass concentration of 1.0% and xylitol with a mass concentration of 0.5%, and conducting heating and stirring for 20 min, followed by ultrasonic treatment for 20 min to obtain a chitosan solution with a mass concentration of 3.0%;

and then coating the front surface of the calcium chloride pretreated base paper with the sodium alginate solution on a roller coater at a rate of 3 cm/s in a coating amount of 3.0 g/m$^2$, and drying the paper in a vacuum drying oven at 55° C. for 15 min to obtain a single-layer oil-proof paper; and then coating the front surface of the single-layer oil-proof paper with the chitosan solution on the roller coater at a rate of 2 cm/s in a coating amount of 3.0 g/m$^2$, and drying the paper in the vacuum drying oven at 60° C. for 10 min to obtain a double-layer oil-proof paper; and (3) treatment with a waterproof coating:

adding carnauba wax into anhydrous ethanol, conducting heating and stirring to obtain a carnauba wax solution with a mass concentration of 1.0%; after the solution was cooled, adding nano zinc oxide particles to obtain a solution with a mass concentration of 3.0%, and conducting magnetic stirring for 20 min to obtain a carnauba wax-nano zinc oxide solution;

and then coating the front surface of the double-layer oil-proof paper with the carnauba wax-nano zinc oxide solution on the roller coater at a rate of 2 cm/s in a coating amount of 3.0 g/m$^2$, and drying the paper in the vacuum drying oven at 35° C. for 10 min to obtain the waterproof and oil-proof wrapping paper.

Comparative Example 1

A waterproof and oil-proof wrapping paper was obtained by eliminating the sodium alginate solution in step (2) of Example 1 and maintaining other operations consistent with those in Example 1.

Comparative Example 2

A waterproof and oil-proof wrapping paper was obtained by eliminating the chitosan solution in step (2) of Example 1 and maintaining other operations consistent with those in Example 1.

Comparative Example 3 Mixing and Elimination of a Crosslinking Agent

Step (2) of Example 1 was adjusted as:

adding sodium alginate into water, conducting heating and stirring for 20 min to make the sodium alginate completely dissolved, adding glycerol with a mass concentration of 0.5%, and conducting magnetic stirring for 10 min, followed by ultrasonic treatment for 20 min to obtain a sodium alginate solution with a mass concentration of 1.5%; adding acetic acid into water to obtain an acetic acid solution with a mass fraction of 1.0%; adding chitosan into the acetic acid solution, adding glycerol with a mass concentration of 0.5%, and conducting heating and stirring for 20 min, followed by ultrasonic treatment for 20 min to obtain a chitosan solution with a mass concentration of 2.0%; and mixing the prepared sodium alginate solution with the chitosan solution at a volume ratio of 1:1, and conducting magnetic stirring for 20 min to obtain a chitosan-sodium alginate solution; and then coating the front surface of the calcium chloride pretreated base paper with the chitosan-sodium alginate solution on a roller coater at a rate of 3 cm/s in a coating amount of 6.0 g/m$^2$, and drying the paper in a vacuum drying oven at 55° C. for 25 min to obtain a single-layer oil-proof paper.

Other operations were maintained consistent with those in Example 1, and a waterproof and oil-proof wrapping paper was obtained.

Comparative Example 4 Mixing

Step (2) of Example 1 was adjusted as:

adding sodium alginate into water, conducting heating and stirring for 20 min to make the sodium alginate completely dissolved, adding glycerol with a mass concentration of 0.5%, and conducting magnetic stirring for 10 min, followed by ultrasonic treatment for 20 min to obtain a sodium alginate solution with a mass concentration of 1.5%; adding acetic acid into water to obtain an acetic acid solution with a mass fraction of 1.0%; adding chitosan into the acetic acid solution, adding glycerol with a mass concentration of 0.5% and vanillic acid with a mass concentration of 1.0%, and conducting heating and stirring for 20 min, followed by ultrasonic treatment for 20 min to obtain a chitosan solution with a mass concentration of 2.0%; and mixing the prepared sodium alginate solution with the chitosan solution at a volume ratio of 1:1, and conducting magnetic stirring for 20 min to obtain a chitosan-sodium alginate solution; and then coating the front surface of the calcium chloride pretreated base paper with the chitosan-sodium alginate solution on a roller coater at a rate of 3 cm/s in a coating amount of 6.0 g/m$^2$, and drying the paper in a vacuum drying oven at 55° C. for 25 min to obtain a single-layer oil-proof paper.

Other operations were maintained consistent with those in Example 1, and a waterproof and oil-proof wrapping paper was obtained.

Comparative Example 5 Replacement of the Treatment with an Oil-Proof Coating and the Treatment with a Waterproof Coating A waterproof and oil-proof wrapping paper was obtained by changing the sequence of step (2) and step (3) of Example 1 and maintaining other operations consistent with those in Example 1.

Performance tests were carried out on the waterproof and oil-proof wrapping papers obtained in examples and comparative examples, and test results are as follows.

TABLE 1

Performance indicators of bio-based waterproof and oil-proof wrapping papers

| Example | Oil-proof level | Cobb value (g/m$^2$) | Tensile strength (kN/m) | Water vapor transmission rate (g/m$^2$ · 24 h) | Air permeability (mL/min) | Paper thickness (mm) |
| --- | --- | --- | --- | --- | --- | --- |
| Example 1 | 12 | 9.50 | 4.60 | 600 | 0.30 | 0.24 |
| Example 2 | 8 | 12.50 | 4.30 | 650 | 0.34 | 0.20 |
| Example 3 | 10 | 13.58 | 4.35 | 643 | 0.41 | 0.22 |
| Example 4 | 11 | 14.88 | 4.38 | 646 | 0.46 | 0.25 |
| Example 5 | 12 | 13.40 | 4.54 | 638 | 0.38 | 0.26 |
| Example 6 | 12 | 14.50 | 4.50 | 640 | 0.42 | 0.28 |
| Comparative Example 1 | 5 | 10.10 | 3.55 | 746 | 0.54 | 0.18 |
| Comparative Example 2 | 5 | 10.15 | 3.60 | 850 | 0.60 | 0.14 |
| Comparative Example 3 | 8 | 10.05 | 4.03 | 712 | 0.45 | 0.20 |
| Comparative Example 4 | 9 | 10.08 | 4.26 | 694 | 0.38 | 0.21 |
| Comparative Example 5 | 10 | 18.10 | 4.30 | 650 | 0.35 | 0.26 |

From Table 1, it can be seen that through comparison of Examples 1, 5 and 6, when the carnauba wax is combined with different nanoparticles in the waterproof coating, different waterproof effects are achieved; and when the nanoparticles are nano silica, the waterproof effect is the best. Through comparison of Examples 1, 2 and 3, when the nanoparticles are nano silica and are combined with different biological waxes in the waterproof coating, different waterproof effects are achieved; and when the biological wax is carnauba wax, the waterproof effect is the best.

Comparative Example 1 is different from Example 1 in that the oil-proof coating is only coated with the chitosan solution. As the paper is only coated with the single-layer oil-proof coating and not coated with the sodium alginate solution, effects of the calcium chloride treated base paper are reduced, and the base paper is not fully filled, leading to a decrease trend of the oil-proof property, the tensile strength and the thickness of the oil-proof paper and an increase trend of the water vapor transmission rate and the air permeability, so that the overall performance of the waterproof and oil-proof paper is reduced.

Comparative Example 2 is different from Example 1 in that the oil-proof coating is only coated with the sodium alginate solution. As the paper is only coated with the single-layer oil-proof coating and not coated with the chitosan solution, although the calcium chloride and the sodium alginate achieve a synergistic effect, the base paper is not fully filled, leading to a decrease trend of the oil-proof property, the tensile strength and the thickness of the oil-proof paper and an increase trend of the water vapor transmission rate and the air permeability, so that the overall performance of the waterproof and oil-proof paper is reduced.

Comparative Example 3 is different from Example 1 in that the chitosan solution and the sodium alginate solution are mixed for coating without adding a crosslinking agent. As the coating is only performed on a single layer without adding a crosslinking agent such as gallic acid, the oil-proof property, the tensile strength and the thickness of the oil-proof paper have a decrease trend, and the water vapor transmission rate and the air permeability have an increase trend, so that the overall performance of the waterproof and oil-proof paper is reduced.

Comparative Example 4 is different from Example 1 in that the chitosan solution and the sodium alginate solution are mixed for coating. As the coating is only performed on a single layer, although vanillic acid is added as a crosslinking agent, the base paper is not fully filled, leading to a decrease trend of the oil-proof property, the tensile strength and the thickness of the oil-proof paper and an increase trend of the water vapor transmission rate and the air permeability, so that the overall performance of the waterproof and oil-proof paper is reduced.

Comparative Example 5 is different from Example 1 in that the coating sequence of the oil-proof coating and the waterproof coating is changed. As the paper has an oil-proof coating on the outer layer and a waterproof coating on the inner layer, the oil-proof coating will absorb water molecules, leading to a decrease trend of the oil-proof property, the tensile strength and the thickness of the oil-proof paper and an increase trend of the water vapor transmission rate and the air permeability, so that the overall performance of the waterproof and oil-proof paper is reduced.

In conclusion, by using a crosslinking agent, the oil-proof coating is bond more closely, and the bio-based waterproof and oil-proof wrapping paper of the present disclosure is high in oil-proof level, high in tensile strength, low in water vapor transmission rate, low in air permeability and good in water resistance.

Although the present disclosure has been disclosed through exemplary examples above, the exemplary examples are not intended to limit the present disclosure, and various changes and modifications can be made by those skilled in the art without departing from the spirit and scope of the present disclosure. Therefore, the scope of protection of the present disclosure shall be as defined by the claims.

What is claimed is:

1. A method for preparing a bio-based waterproof and oil-proof wrapping paper, which comprises:
    (a) impregnating base paper in a calcium chloride solution to initiate pretreatment,
    (b) removing the base paper from the solution, and
    (c) drying the base paper to obtain a calcium chloride pretreated base paper;
    (d) uniformly mixing sodium alginate, a plasticizer, and water to obtain a sodium alginate solution, wherein the sodium alginate solution comprises 0.5% to 2.0% by mass of the sodium alginate and 0.4% to 0.6% by mass of the plasticizer, and wherein the plasticizer comprises one or more of glycerol, xylitol, and sorbitol;

(e) uniformly mixing an acetic acid aqueous solution, chitosan, the plasticizer, and a crosslinking agent to obtain a chitosan solution, wherein the chitosan solution comprises 1.0% to 3.0% by mass of the chitosan, 0.4% to 0.6% by mass of the plasticizer, and 0.8% to 1.2% by mass of the crosslinking agent, and wherein the crosslinking agent comprises one or more of itaconic acid and vanillic acid;

(f) coating a surface of the calcium chloride pretreated base paper with the sodium alginate solution, (g) drying the coated pretreated base paper from (f) to obtain a single-layer oil-proof paper;

(h) coating a surface of the single-layer oil-proof paper with the chitosan solution, and (i) drying to obtain a double-layer oil-proof paper;

(j) preparing a biological wax-nanoparticle solution by adding nanoparticles into a biological wax solution to obtain a biological wax-nanoparticle solution;

(k) treating a surface of the double-layer oil-proof paper from (i) by coating a surface of the double-layer oil-proof paper with the biological wax-nanoparticle solution from (j), and (l) drying the double-layer oil-proof paper from (k) to obtain a bio-based waterproof and oil-proof wrapping paper;

wherein the biological wax comprises one or more of carnauba wax, beeswax, soybean wax, and candelilla wax;

wherein the nanoparticles comprise one or more of nano silica, having a particle size of 7 nm to 40 nm and nano zinc oxide having a particle size of 80 nm;

wherein a mass concentration of the biological wax solution is 0.2% to 5.0% and a mass concentration of the nanoparticles is 0.2% to 3.0%.

2. The method according to claim 1, wherein in step (d), the sodium alginate solution is coated at a rate of 1 cm/s to 6 cm/s in a coating amount of 1.0 $g/m^2$ to 5.0 $g/m^2$; and the drying is conducted at 50° C. to 65° C. for 10 to 30 minutes.

3. The method according to claim 1, wherein in step (d), the chitosan solution is coated at a rate of 1 cm/s to 4 cm/s in a coating amount of 1.0 $g/m^2$ to 5.0 $g/m^2$; and the drying is conducted at 50° C. to 60° C. for 10 to 30 minutes.

4. The method according to claim 1, wherein in step (k), the coating is conducted at a rate of 1 cm/s to 5 cm/s in a coating amount of 1.0 $g/m^2$ to 6.0 $g/m^2$; and the drying is conducted at 30° C. to 50° C. for 10 to 35 minutes.

5. The method of claim 1, wherein the plasticizer is glycerol.

6. The method of claim 1, wherein the plasticizer is xylitol.

7. The method of claim 1, wherein the crosslinking agent is itaconic acid.

8. The method of claim 1, wherein the crosslinking agent is vanillic acid.

9. The method of claim 1, wherein the biological wax is carnauba wax.

10. The method of claim 1, wherein the plasticizer is glycerol, wherein the crosslinking agent is vanillic acid, wherein the biological wax is carnauba wax, and wherein the nanoparticle is nano silica.

11. The method of claim 1, wherein the plasticizer is glycerol, wherein the crosslinking agent is vanillic acid, wherein the biological wax is candelilla wax, and wherein the nanoparticle is nano silica.

12. The method of claim 1, wherein the plasticizer is xylitol, wherein the crosslinking agent is itaconic acid, and wherein the biological wax is carnauba wax.

13. The method of claim 1, wherein the plasticizer is xylitol, wherein the crosslinking agent is itaconic acid, wherein the biological wax is carnauba wax, and wherein the nanoparticle is nano zinc oxide.

* * * * *